US012085412B2

(12) United States Patent
Kim et al.

(10) Patent No.: US 12,085,412 B2
(45) Date of Patent: Sep. 10, 2024

(54) MOVABLE DEVICE AND METHOD FOR SENSING INCLINATION OF DISTANCE SENSOR ATTACHED TO MOVABLE DEVICE

(71) Applicant: SAMSUNG ELECTRONICS CO., LTD., Suwon-si (KR)

(72) Inventors: Jinwon Kim, Suwon-si (KR); Junggap Kuk, Suwon-si (KR); Musik Kwon, Suwon-si (KR); Seungbeom Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 646 days.

(21) Appl. No.: 17/295,289

(22) PCT Filed: Nov. 5, 2019

(86) PCT No.: PCT/KR2019/014906
§ 371 (c)(1),
(2) Date: May 19, 2021

(87) PCT Pub. No.: WO2020/105906
PCT Pub. Date: May 28, 2020

(65) Prior Publication Data
US 2021/0404804 A1  Dec. 30, 2021

(30) Foreign Application Priority Data
Nov. 20, 2018  (KR) .................. 10-2018-0143906

(51) Int. Cl.
*G01C 9/02*  (2006.01)
*G01C 22/00*  (2006.01)

(52) U.S. Cl.
CPC ............... *G01C 9/02* (2013.01); *G01C 22/00* (2013.01)

(58) Field of Classification Search
CPC .......... G01C 9/02; G01C 22/00; G01C 25/00; G01S 15/931; G01S 7/4972;
(Continued)

(56) References Cited

U.S. PATENT DOCUMENTS 6,873,406 B1  3/2005  Hines et al.
7,649,331 B2  1/2010  Hosoda et al.
(Continued)

FOREIGN PATENT DOCUMENTS

JP  09-325812       12/1997
JP  09325812 A  *  12/1997
(Continued)

OTHER PUBLICATIONS

Notice of Non-Final Rejection dated Nov. 2, 2020 in counterpart Korean Application No. 10-2018-0143906 and English-language machine translation.
(Continued)

*Primary Examiner* — Yaritza Guadalupe-McCall
(74) *Attorney, Agent, or Firm* — Nixon & Vanderhye, P.C.

(57) ABSTRACT

A method, performed by a movable device, of sensing an inclination of a distance sensor attached to the movable device includes sensing an obstacle fixed in a task space of the movable device; the movable device moving toward the sensed obstacle; while the movable device is moving, measuring a plurality of first distance values from the movable device to the obstacle by using the distance sensor; obtaining at least one second distance value indicating a moving distance of the movable device while measuring the plurality of first distance values, using odometry information of the movable device; and identifying an inclination state of the
(Continued)

distance sensor based on the plurality of measured first distance values and the obtained at least one second distance value.

15 Claims, 7 Drawing Sheets

(58) Field of Classification Search
CPC ...... G01S 17/931; G05D 1/02; G05D 1/0257; G05D 1/0212; G05D 1/0272
See application file for complete search history.

(56) References Cited

U.S. PATENT DOCUMENTS

| | | | |
|---|---|---|---|
| 7,706,921 B2 | 4/2010 | Jung | |
| 8,306,684 B2* | 11/2012 | Nakano | G05D 1/027 701/25 |
| 9,952,317 B2* | 4/2018 | Valois | G01S 17/08 |
| 10,539,664 B2* | 1/2020 | Baik | G01S 7/4815 |
| 2015/0185322 A1* | 7/2015 | Haegermarck | G01S 17/86 901/1 |
| 2020/0108499 A1* | 4/2020 | Vicenti | G05D 1/0219 |
| 2020/0116841 A1 | 4/2020 | Baik et al. | |
| 2021/0404804 A1* | 12/2021 | Kim | G01S 17/931 |

FOREIGN PATENT DOCUMENTS

| | | | | |
|---|---|---|---|---|
| JP | 2006-136962 | | 6/2006 | |
| JP | 2006136962 A | * | 6/2006 | ............. B25J 5/007 |
| KR | 10-0575708 | | 5/2006 | |
| KR | 10-2014-0005516 | | 1/2014 | |
| KR | 20140005516 A | * | 1/2014 | |
| KR | 10-1380260 | | 4/2014 | |
| KR | 101380260 B1 | * | 4/2017 | |
| KR | 10-2017-0127350 | | 11/2017 | |
| KR | 20170127350 A | * | 11/2017 | |
| KR | 10-2017-0132977 | | 12/2017 | |

OTHER PUBLICATIONS

Search Report and Written Opinion dated Feb. 21, 2020 in counterpart International Application No. PCT/KR2019/014906.

* cited by examiner

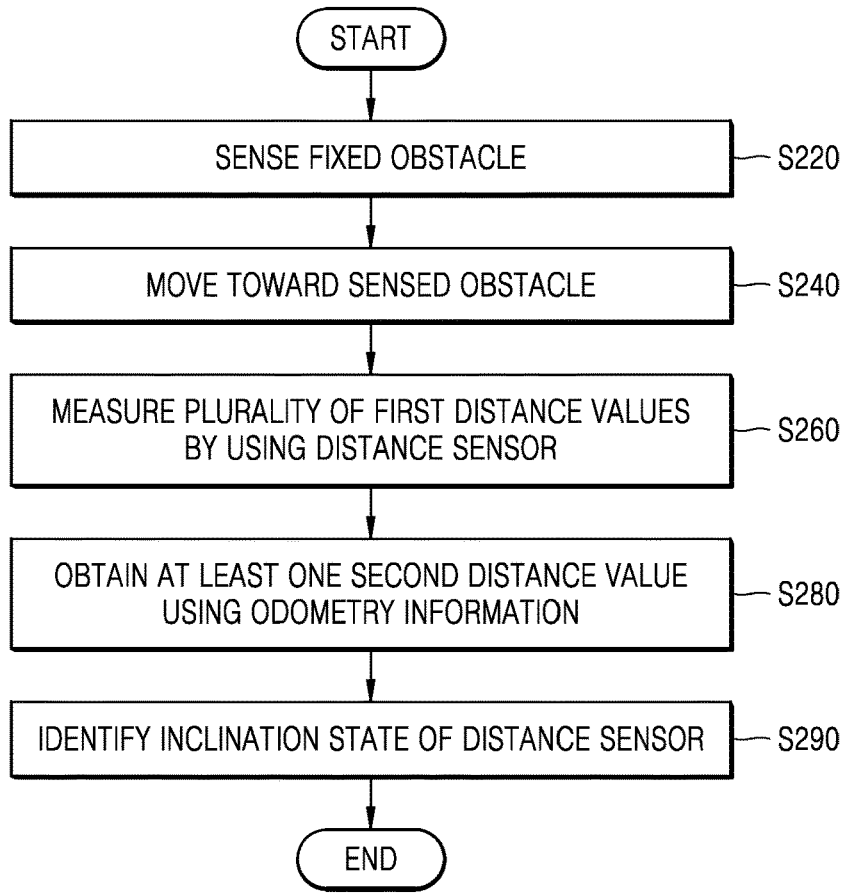
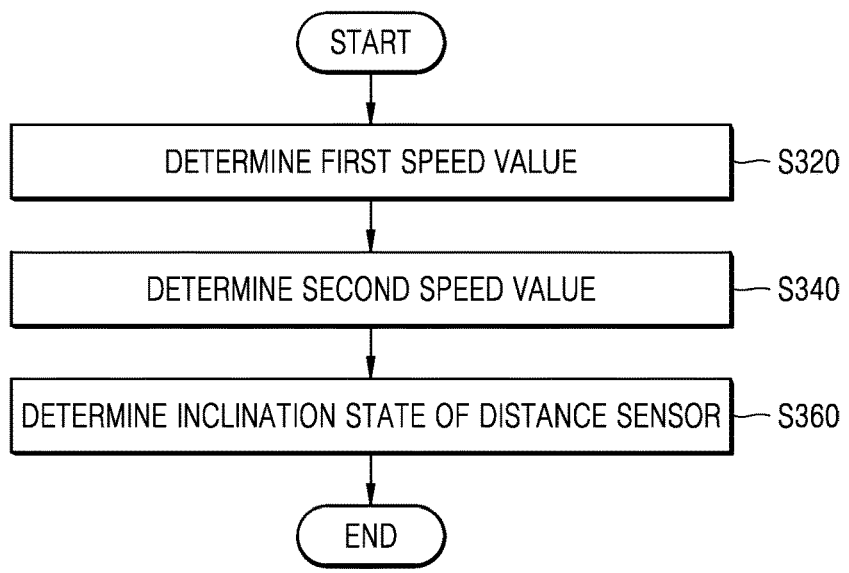

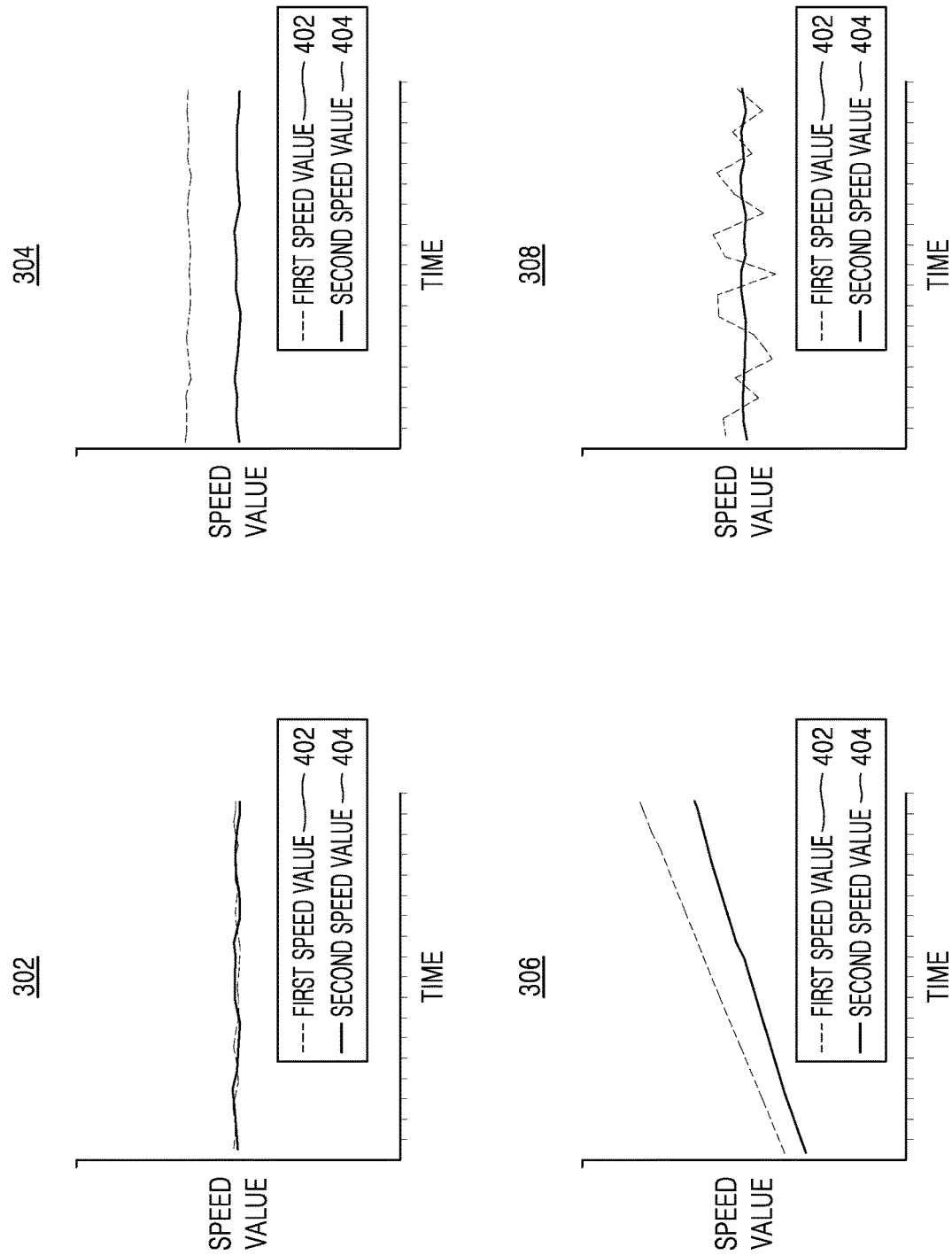

MOVABLE DEVICE AND METHOD FOR SENSING INCLINATION OF DISTANCE SENSOR ATTACHED TO MOVABLE DEVICE

This application is the U.S. national phase of International Application No. PCT/KR2019/014906 filed 5 Nov. 2019, which designated the U.S. and claims priority to KR Patent Application No. 10-2018-0143906 filed 20 Nov. 2018, the entire contents of each of which are hereby incorporated by reference.

TECHNICAL FIELD

The present disclosure relates to a movable device and a method of sensing an inclination of a sensor attached to the movable device. More specifically, the present disclosure relates to a method of sensing an inclination of a distance sensor attached to the movable device.

BACKGROUND ART

Technologies related to autonomous driving devices capable of self-driving, including drive control device, sensors, and driving control means, have been developed. For example, a cleaning robot may perform a cleaning operation of sucking dust and foreign materials from the floor while traveling by itself in a cleaning zone to be cleaned without a manipulation of a user.

Movable devices that move by themselves, including a drive control device and a distance sensor, may sense a distance to obstacles such as furniture, office supplies, and walls installed in a task space through sensors in the movable devices, and perform various tasks using information about the sensed distance.

Locations and directions of sensors mounted on autonomously movable devices may change due to external impacts and wear of devices in the movable device while the movable device is moving, and as a result, there is a risk of a malfunction occurring in the movable device using a sensor value measured by the sensor. However, in order to identify an inclination state of the sensor mounted on the movable devices, there is a problem in that the cost increases due to an installation of an additional sensor to sense the corresponding sensor and processing of a sensor value measured by the additionally installed sensor.

Therefore, there is a need to develop a technology for effectively identifying an inclination state of a distance sensor attached to a movable device.

DESCRIPTION OF EMBODIMENTS

Technical Problem

According to an embodiment, provided is a device and a method for sensing an inclination of a sensor attached to a movable device.

Specifically, provided is a method of sensing an inclination of a distance sensor attached to a movable device and the movable device for sensing the inclination of the distance sensor.

Solution to Problem

According to an embodiment, a method, performed by a movable device, of sensing an inclination of a distance sensor attached to the movable device may include sensing a fixed obstacle in a task space of the movable device; moving toward the sensed obstacle; while the movable device is moving, measuring a plurality of first distance values from the movable device to the obstacle by using the distance sensor; obtaining at least one second distance value indicating a moving distance of the movable device while measuring the plurality of first distance values, using odometry information of the movable device; and identifying an inclination state of the distance sensor based on the plurality of measured first distance values and the obtained at least one second distance value.

According to another embodiment, a movable device for sensing an inclination of a distance sensor may include the distance sensor configured to measure a distance; at least one memory storing one or more instructions; and at least one processor configured to execute the one or more instructions, wherein the processor is configured to execute the one or more instructions to: sense a fixed obstacle in a task space of the movable device; move the movable device toward the sensed obstacle; while the movable device is moving, measure a plurality of first distance values from the movable device to the obstacle by using the distance sensor; obtain at least one second distance value indicating a moving distance of the movable device while measuring the plurality of first distance values, using odometry information of the movable device; and identify an inclination state of the distance sensor based on the plurality of measured first distance values and the obtained at least one second distance value.

According to another embodiment, a computer-readable recording medium having recorded thereon a program for performing a method, performed by a movable device, of sensing an inclination of a distance sensor attached to the movable device may include sensing a fixed obstacle in a task space of the movable device; the movable device moving toward the sensed obstacle; while the movable device is moving, measuring a plurality of first distance values from the movable device to the obstacle by using the distance sensor; obtaining at least one second distance value indicating a moving distance of the movable device while measuring the plurality of first distance values, using odometry information of the movable device; and identifying an inclination state of the distance sensor based on the plurality of measured first distance values and the obtained at least one second distance value.

Advantageous Effects of Disclosure

According to a method of sensing an inclination of a distance sensor attached to a movable device according to the present disclosure, the movable device accurately senses a distance to an obstacle by accurately sensing the inclination of the distance sensor.

BRIEF DESCRIPTION OF DRAWINGS

FIG. 2 is a flowchart illustrating a method, performed by a movable device, of sensing an inclination of a distance sensor attached to the movable device according to an embodiment.

FIG. 3 is a flowchart illustrating a method, performed by a movable device, of determining an inclination state of a distance sensor according to an embodiment.

FIG. 4 is a diagram illustrating a first speed value and a second speed value measured differently from each other according to a moving state of a movable device.

BEST MODE

Figure 1:
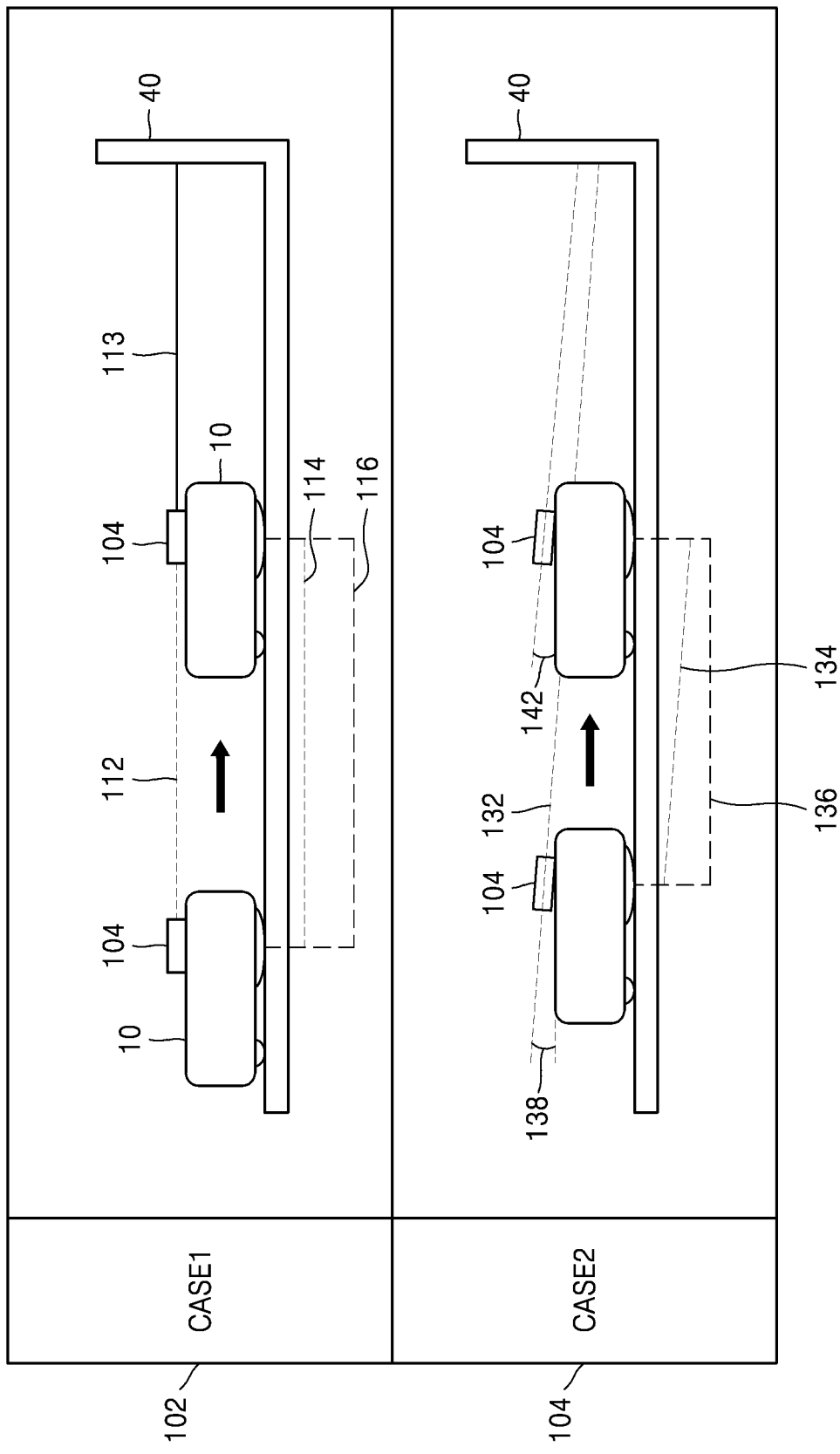
FIG. 1 is a diagram for comparing a first distance value measured differently according to an inclination state of a sensor attached to a movable device and a second distance value indicating a distance of the movable device.

According to an embodiment, a method, performed by a movable device, of sensing an inclination of a distance sensor attached to the movable device may include sensing a fixed obstacle in a task space of the movable device; moving toward the sensed obstacle; while the movable device is moving, measuring a plurality of first distance values from the movable device to the obstacle by using the distance sensor; obtaining at least one second distance value indicating a moving distance of the movable device while measuring the plurality of first distance values, using odometry information of the movable device; and identifying an inclination state of the distance sensor based on the plurality of measured first distance values and the obtained at least one second distance value.

According to another embodiment, a movable device for sensing an inclination of a distance sensor may include the distance sensor configured to measure a distance; at least one memory storing one or more instructions; and at least one processor configured to execute the one or more instructions, wherein the processor is configured to execute the one or more instructions to: sense a fixed obstacle in a task space of the movable device; move the movable device toward the sensed obstacle; while the movable device is moving, measure a plurality of first distance values from the movable device to the obstacle by using the distance sensor; obtain at least one second distance value indicating a moving distance of the movable device while measuring the plurality of first distance values, using odometry information of the movable device; and identify an inclination state of the distance sensor based on the plurality of measured first distance values and the obtained at least one second distance value.

MODE OF DISCLOSURE

The terms used in this specification will be briefly described and embodiments of the disclosure will be described in detail.

The terms used in the disclosure are selected from among common terms that are currently widely used in consideration of their function in the disclosure. However, the terms may be different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the specification, when a part "includes" an element, it is to be understood that the part additionally includes other elements rather than excluding other elements as long as there is no particular opposing recitation. The terms "interface" and "module" as used herein represent a unit for processing at least one function or operation, which may be implemented by hardware, software, or a combination thereof.

Hereinafter, embodiments of the disclosure will now be described more fully with reference to the accompanying drawings for one of ordinary skill in the art to be able to perform the disclosure without any difficulty. The disclosure may, however, be embodied in many different forms and should not be construed as being limited to the embodiments of the disclosure set forth herein. Also, parts in the drawings unrelated to the detailed description are omitted to ensure clarity of the disclosure. Like reference numerals in the drawings denote like elements.

FIG. 1 is a diagram for comparing a first distance value measured differently according to an inclination state of a sensor attached to a movable device 10 and a second distance value indicating a distance of the movable device 10.

The movable device 10 according to an embodiment of the present disclosure may include a driver and a plurality of sensors. The movable device 10 according to the present disclosure may be an autonomous driving device capable of self-driving by using the driver and the plurality of sensors. According to an embodiment, the movable device 10 may measure a distance between the movable device and an obstacle obstructing at least one of a task and a movement of the movable device in a task space using at least one distance sensor attached to the movable device. In the present specification, the task space of the movable device may include a moving area in which the movable device moves, and the task space may represent a physical space in which the movable device and a task target object of the movable device are.

The distance sensor used by the movable device 10 according to the present disclosure to measure the distance to the obstacle may be a LIDAR sensor, but is not limited thereto. For example, the LIDAR sensor used by the movable device 10 may measure the distance to the obstacle using at least one of a time-of-flight (TOF) method and a triangle method. Preferably, the distance sensor according to the present disclosure may be a 2D-LIDAR sensor that is a sensor using a distance measurement method of the triangulation method. Further, the distance sensor according to the present disclosure may correspond to a range sensor for measuring a distance by using a wireless signal including an ultrasonic wave, an infrared ray, and a laser signal.

For example, referring to FIG. 1, in case 2 104, while the movable device 10 equipped with a distance sensor 104 is moving, a location and a direction of the distance sensor 104 mounted on the moving device 10 may change due to a task impact, an external obstacle impact, and an abrasion of parts inside the movable device. In the present specification, the location of the distance sensor 104 mounted on the movable device 10 may have the center of the movable device 10 and the distance sensor 104 as the origin, and may be specified as a coordinate value (e.g., an angle value) indicating a degree of inclination with respect to a pitch axis, a lateral axis, a roll longitudinal axis, and a yaw vertical axis.

For example, in the present specification, when the movable device 10 is a device that satisfies a non-holonomic constraint, the movable device 10 may move forward in a direction of a front portion of the movable device 10 and may move backward in a direction of a rear portion of the movable device 10. In addition, when the movable device 10 described herein satisfies the non-holonomic constraint, a moving direction of the movable device 10 and a direction of a front portion of the moving direction may not coincide. That is, the movable device 10 may move in all directions, not in the direction of the front or rear portion. The front portion of the movable device 10 described in the present specification may mean the moving direction of the movable device when the movable device 10 satisfies the non-holonomic constraint, but is not limited thereto.

For example, in the present specification, the roll axis of the movable device may mean an axis parallel to the direction of the front portion of the movable device. That is, the roll axis according to the present disclosure may be at least one axis positioned on a horizontal plane with respect to a direction in which the movable device moves. In addition, the yaw axis may mean an axis that faces the floor of the movable device 10 in a state perpendicular to the roll axis. In addition, the pitch axis may be an axis perpendicular to the roll axis and the pitch axis, which may be at least one axis positioned on a vertical plane with respect to the direction of the front portion in which the movable device moves.

Referring to case1 102 of FIG. 1, when the movable device 10 moves toward a wall, the location of the movable device 10 at a time t1 and the location of the movable device 10 at a time t2 after the time t1 are shown. The movable device 10 may include the distance sensor 104. When the distance sensor 104 of the movable device 10 is attached to the movable device 10 in a state parallel to the direction in which the movable device moves (for example, case1 102), a distance 114 that the movable device 10 moves between the time t1 and the time t2 determined based on a first distance value measured by the distance sensor 104 at the time t1 and a first distance value measured by the distance sensor 104 at the time t2 may be measured in the same way as a distance 116 that the movable device 10 moves between the time t1 and the time t2 determined based on a second distance value obtained based on odometry information of the movable device 10.

However, referring to case2 104 of FIG. 1, when the distance sensor 104 of the movable device 10 is attached to the movable device 10 in a state that is not parallel to the direction in which the movable device 10 moves (for example, case1 102), a distance 134 that the movable device 10 moves between the time t1 and the time t2 determined based on the first distance value measured by the distance sensor 104 at the time t1 and the first distance value measured by the distance sensor 104 at the time t2 may be measured to be greater than a distance 136 that the movable device 10 moves between the time t1 and the time t2 determined based on the second distance value obtained based on the odometry information of the movable device 10.

Therefore, when the distance sensor 104 of the movable device 10 is attached to the movable device 10 in the state that is not parallel to the direction in which the movable device 10 moves (for example, case1 102), a variation of the first distance value measured by the distance sensor 104 at any time between the times t1 and t2 may be greater than a variation of the second distance value obtained based on the odometry information of the movable device 10 measured at any time between the times t1 and t2. The movable device 10 according to the present disclosure may identify the inclination state of the distance sensor by comparing the variation of the first distance value determined based on the first distance value measured by the distance sensor 104 with the variation of the second distance value determined based on the odometry information.

In the present specification, the odometry information may be information previously set to estimate the moving distance of the movable device by using driving information associated with the driver of the movable device. For example, the odometry information may include information for estimating a location and a posture of the current movable device using the distance sensor, a center of gravity of the movable device, and an output of a wheel encoder that generates a pulse in connection with the driver of the movable device. According to an embodiment, the odometry information may include information about tics of a motor in the driver, a displacement of a drive shaft connected to the motor, and a rotation distance of a wheel connected to the motor. According to another embodiment, the odometry information according to the present disclosure may further include information for estimating a location, a posture, and a speed of the movable device on a map prepared based on a simultaneous localization and mapping (SLAM) process performed by the movable device 10.

FIG. 2 is a flowchart illustrating a method, performed by the movable device 10, of sensing an inclination of a distance sensor attached to the movable device 10 according to an embodiment.

In S220, the movable device 10 may sense a fixed obstacle in a task space. An obstacle described in the present specification is an object that obstructs a movement and a task of the movable device 10 and may mean an object fixed to a specific point in a task space. According to an embodiment, the obstacle may include a wall in the task space of the movable device 10. For example, the movable device 10 may sense the obstacle using a distance sensor attached to the movable device. According to another embodiment, the movable device 10 may sense the obstacle by using information about a location of the movable device estimated on a map prepared through an SLAM process and information about the obstacle determined relative to the location of the movable device estimated on the map.

In S240, the movable device 10 may move toward the sensed obstacle. According to an embodiment, moving of the movable device 10 toward the sensed obstacle may include an operation of moving straight toward the sensed obstacle. According to another embodiment, the movable device 10 according to the present disclosure may move straight in a direction opposite to the sensed obstacle. The moving of the movable device 10 according to the present disclosure straight toward the sensed obstacle may include an operation of moving straight toward the sensed obstacle by the movable device 10 while a roll axis of the movable device 10 is perpendicular to the sensed obstacle, but is not limited thereto.

For example, the moving of the movable device 10 according to the present disclosure straight toward the sensed obstacle may include an operation of moving straight toward the obstacle by the movable device 10 according to the present disclosure while the roll axis of the movable device 10 is not perpendicular to the sensed obstacle. That is, the moving of the movable device 10 according to the present disclosure straight may mean a state where a direction in which the movable device moves toward the obstacle does not change.

In S260, the movable device 10 may measure a plurality of first distance values using the distance sensor. In the present specification, the first distance value may represent distance value measured by the distance sensor when the movable device 10 moves straight with respect to the obstacle. For example, the movable device 10 may measure the first distance value while moving straight toward the sensed obstacle, or may measure the first distance value while moving straight in the direction opposite to the sensed obstacle.

According to an embodiment, the operation of measuring the first distance value by the movable device 10 may be an operation of measuring the first distance value to the obstacle at a previously set time interval while the movable device is moving. That is, while the movable device is moving, the movable device 10 may measure a first distance to the obstacle repeatedly at the previously set time interval. In the present specification, the operation of measuring the first distance value by the movable device 10 may be measuring the first distance from the distance sensor 104 of the movable device to the obstacle.

In S280, the movable device 10 may obtain at least one second distance value indicating a moving distance of the movable device by using odometry information. In the present specification, the odometry information may be information previously set to estimate a moving distance of the movable device using driving information associated with a driver of the movable device. The odometry information according to the present disclosure may be previously stored in a memory of the movable device 10 or may be information calculated in real time by a processor of the movable device 10.

In S290, the movable device 10 may identify an inclination state of the distance sensor based on the measured first distance values and the obtained at least one second distance value. For example, the movable device 10 may determine a first speed value based on the measured first distance values, may determine a second speed value based on the at least one second distance value obtained from the odometry information, and may identify the inclination state of the distance sensor based on the determined first speed value and second speed value. A process in which the movable device 10 identifies the inclination state of the distance sensor based on the plurality of first distance values and the at least one second distance value will be described in detail with reference to FIG. 3.

According to another embodiment, the method of sensing the inclination of the distance sensor attached to the movable device may further include an operation of arranging an attachment surface to which the distance sensor is attached to a fixed obstacle at a previously set angle when the obstacle is sensed. For example, the movable device 10 according to the present disclosure may move straight toward the sensed obstacle after the distance sensor is aligned at the previously set angle on the attachment surface of the movable device. According to an embodiment, the attachment surface to which the distance sensor is attached may be formed on at least one surface of an upper portion of the movable device 10, or may be formed on at least one surface of the distance sensor and a sensor driver of the upper portion of the movable device 10.

In the present specification, a case where the distance sensor 104 of the movable device 10 is attached to a state that is not parallel to the direction in which the movable device 10 moves may include a state in which the distance sensor 104 is attached to be spaced apart from the upper portion of the movable device 10 or the sensor driver fixed to the upper portion of the movable device 10 at previously set angles 138 and 142. According to an embodiment, the distance sensor may emit light to the fixed obstacle and receive reflected light from the obstacle in a previously set direction while rotating according to a previously set number of rotations by the sensor driver for controlling an operation of the distance sensor.

For example, the distance sensor may emit light to a wall in the task space of the movable device and receive reflected light from the wall in a previously set direction while rotating according to a previously set number of rotations on the upper portion of the movable device 10 by the sensor driver. According to an embodiment, the movable device 10 may receive only light of the reflective light reflected from the fixed obstacle in a vertically reflected direction. According to another embodiment, the movable device 10 may receive only light of the reflective light reflected from the fixed obstacle that moves in the shortest path from the obstacle to the movable device.

According to an embodiment, the distance sensor according to the present disclosure may include a light emitter that emits light and, when the emitted light is reflected from the fixed obstacle, a light receiver that receives light of the reflective light reflected from the fixed obstacle in a previously set direction. The light emitter and the light receiver in the distance sensor may be spaced apart from a light emitting point of the light emitter and a light receiving point of the light receiver by a previously set distance in a direction horizontal to a support surface of the support plate.

For example, the distance sensor according to the present disclosure may be a LIDAR sensor that measures a distance to an obstacle sensed by a triangulation method. According to an embodiment, the distance sensor according to the present disclosure may measure a distance between the movable device and the obstacle by using at least one of a base distance between the light emitter and the light receiver, an angle formed by the light emitter and the light receiver, and a distance between the light receiver and a CCD sensor in the LIDAR sensor.

FIG. 3 is a flowchart illustrating a method, performed by the movable device 10, of determining an inclination state of the distance sensor 104 according to an embodiment.

In S320, the movable device 10 may determine a first speed value of the movable device based on a plurality of measured first distance values. The first distance value according to the present disclosure may mean a first distance value between the movable device 10 and an obstacle measured while the movable device 10 moves straight toward the obstacle. According to another embodiment, the first distance value according to the present disclosure may mean a first distance value between the distance sensor and the obstacle measured while the movable device 10 moves straight toward the obstacle.

For example, the first speed value determined by the movable device 10 may include a variation of the first distance value. For example, referring to FIG. 1, the movable device 10 may measure the variation of the first distance value during an arbitrary time between the time t1 and the time t2. In S340, the movable device 10 may determine a second speed value of the movable device based on at least one second distance value obtained from odometry information. For example, the second speed value determined by the movable device 10 may include a variation of the second distance value.

For example, referring to FIG. 1, the movable device 10 may determine the second speed value based on the at least one second distance value determined from the odometry information during the arbitrary time between the time t1 and the time t2. The second speed value according to the present disclosure may include the variation of the second distance value during the arbitrary time between the time t1 and the time t2.

In S360, the movable device 10 may identify the inclination state of the distance sensor based on the determined first and second speed values. For example, when the distance sensor 104 of the movable device 10 is attached to the movable device 10 in a state that is not parallel to the direction in which the movable device 10 moves (for example, case1 102), the variation of the second distance value measured by the distance sensor 104 during the arbitrary time between the time t1 and the time t2 may be greater than the variation of the second distance value obtained based on the odometry information of the movable device 10 measured during the arbitrary time between the time t1 and the time t2. Accordingly, the first speed value determined by the movable device 10 based on the first distance value measured by the distance sensor 104 may be measured to be greater than the second speed value determined based on the second distance value obtained based on the odometry information. The movable device 10 according to the present disclosure may identify that the distance sensor 104 of the movable device is in an inclined state when the first speed value is greater than the second speed value by more than a previously set threshold.

More specifically, while the movable device 10 is moving toward the obstacle, when the first speed value is measured to be greater than the second speed value, the movable device 10 may identify that the distance sensor of the movable device is in an inclined state with respect to a pitch axis of the movable device.

According to another embodiment, when a difference between the determined first speed value and the determined second speed value is more than a previously set range, the movable device 10 may identify that the distance sensor is in an inclined state with respect to the pitch axis of the movable device. The distance sensor attached to the movable device 10 according to the present disclosure may be inclined in a positive or negative direction with respect to the pitch axis and a roll axis of the movable device, but may not be inclined with respect to the yaw axis and may be fixed.

FIG. 4 is a diagram illustrating a first speed value and a second speed value measured differently from each other according to a moving state of the movable device 10.

Referring to a graph 302 of FIG. 4, it may be seen that when the movable device 10 moves at a constant speed and a distance sensor is not inclined, the first speed value determined based on a plurality of first distance values measured by a distance sensor and the second speed value determined based on a plurality of second distance values obtained using odometry information are measured to be substantially the same.

However, referring to a graph 304 of FIG. 4, it may be seen that when the movable device 10 moves at a constant speed and the distance sensor is inclined, a first speed value 402 determined based on a plurality of first distance values measured by the distance sensor and a second speed value 404 determined based on a plurality of second distance values obtained using the odometry information are differently measured. For example, when a difference between the first speed value 402 and the second speed value 404 measured while a front portion of the movable device 10 moves toward an obstacle is more than a previously set range, the movable device 10 may identify that the distance sensor is in an inclined state with respect to a pitch axis of the movable device 10. According to another embodiment, when the first speed value is measured to be greater than the second speed value, the movable device 10 may identify that an inclination of the distance sensor is in an inclined state with respect to the pitch axis.

Referring to a chart 306 of FIG. 4, it may be seen that when the movable device 10 moves at a constant acceleration and the distance sensor is inclined, the first speed value 402 determined based on the plurality of first distance values measured by the distance sensor and the second speed value 404 determined based on the plurality of second distance values obtained using the odometry information are differently measured. Specifically, when a difference between the first speed value 402 and the second speed value 404 measured while the front portion of the movable device 10 moves toward the obstacle is more than the previously set range, the movable device 10 may identify that the inclination of the distance sensor of the movable device is in an inclined state with respect to the pitch axis.

Referring to a chart 308 of FIG. 4, while the movable device 10 moves at a constant velocity toward the obstacle, the first speed value 402 determined based on the measured first distance values and the second speed value 404 determined based on the plurality of second distance values obtained using the odometry information are shown. A reflective surface of the obstacle to which a laser signal transmitted from the distance sensor according to the present disclosure is reflected may not be flat, and thus, the first speed value 402 determined using the first distance value measured from a signal received in a previously set direction in a reflective light reflected from the obstacle may not be uniform. That is, when the reflective surface of the obstacle according to the present disclosure is not uniform, the first speed value obtained by the movable device 10 may not exhibit a constant tendency.

According to an embodiment, even when the reflective surface of the obstacle on which the laser signal is incident and reflected is not uniform, the movable device 10 according to the present disclosure may repeatedly measure the plurality of first distance values using the distance value and repeatedly determine the first speed value using the plurality of repeatedly measured first distance values, so as to accurately identify the inclination state of the distance sensor. The movable device 10 may identify the inclination state of the distance sensor by using an average of the plurality of repeatedly determined first speed values even when the reflective surface of the obstacle is not uniform.

Figure 5:
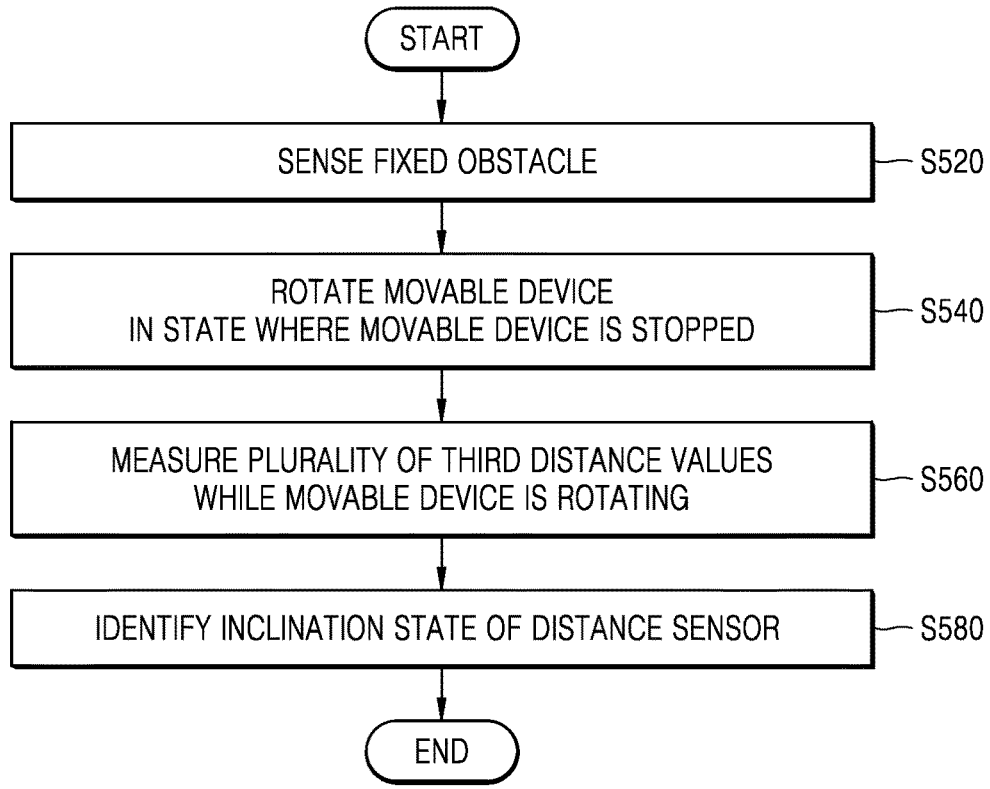
FIG. 5 is a flowchart illustrating a method of sensing an inclination of a distance sensor while a movable device is rotating in a stopped state according to an embodiment.

FIG. 5 is a flowchart illustrating a method of sensing an inclination of a distance sensor while the movable device 10 is rotating in a stopped state according to an embodiment.

According to another embodiment, the movable device 10 according to the present disclosure may not move toward a sensed obstacle, and may identify an inclination state of the distance sensor using a second distance value measured while rotating in place.

For example, in S520, the movable device 10 may sense a fixed obstacle in a task space of the movable device 10. A configuration in which the movable device 10 senses the fixed obstacle in S520 may correspond to S220 of FIG. 2, and thus, a detailed description thereof will be omitted.

In S540, the movable device 10 may rotate the movable device in a state where the movable device is stopped. For example, the movable device 10 may move toward the sensed obstacle or stop while moving in a direction opposite to the sensed obstacle, and the movable device 10 may rotate in a previously set direction in the stopped state. For example, the movable device 10 according to the present disclosure may rotate by a previously set angle interval in the stopped state, and may measure a plurality of third distance values while the movable device 10 rotates at a previously set interval.

A first distance value according to the present disclosure may include at least one of a distance value between the movable device 10 and the obstacle measured while the movable device 10 moves toward the obstacle, and a distance value between the movable device 10 and the obstacle measured while the movable device 10 moves in a direction opposite to the obstacle, the second distance value may include a moving distance value of the movable device obtained based on odometry information of the movable device, and a third distance value may include a distance value between the movable device and the obstacle measured by the distance sensor while the movable device 10 is rotating.

In S560, the movable device 10 may measure a plurality of third distance values from the movable device 10 to the sensed obstacle while the movable device is rotating. For example, the movable device 10 may rotate at a previously set interval, and the movable device 10 may measure the plurality of third distance values from the movable device 10 to the sensed obstacle while the movable device is rotating at the previously set interval According to an embodiment, while a front portion of the movable device 10 faces the obstacle, the movable device may measure the third distance value between the movable device 10 and the obstacle while rotating every 90 degrees. For example, the movable device 10 may measure the third distance value while the front portion of the movable device 10 faces the obstacle, and may measure the third distance value after the movable device rotates by 90 degrees counterclockwise with respect to a state where the front portion faces the obstacle.

In addition, the movable device 10 may measure the third distance value after the movable device rotates by 180 degrees counterclockwise with respect to the state where the front portion faces the obstacle and may measure the third distance value after the movable device rotates by 270 degrees counterclockwise with respect to the state where the front portion faces the obstacle. In addition, the movable device 10 may measure the third distance value in a state where the movable device 10 rotates by 360 degrees counterclockwise (for example, a state where the front portion of the movable device faces back toward the obstacle) with respect to the state where the front portion of the movable device 10 faces the obstacle.

In S580, the movable device 10 may identify the inclination state of the distance sensor by comparing the plurality of measured third distance values with each other. According to an embodiment, the movable device 10 may identify the inclination state of the distance sensor by comparing the third distance value measured while the front portion of the movable device 10 rotates 180 degrees or 360 degrees with respect to the state where the front portion of the movable device 10 faces the obstacle with the third distance value measured while the front portion of the movable device 10 rotates 90 degrees or 270 degrees with respect to the state where the front portion of the movable device 10 faces the obstacle. A specific method, performed by the movable device 10, of identifying the inclination state of the distance sensor by comparing the measured third distance values will be described in detail with reference to FIG. 6.

Figure 6:
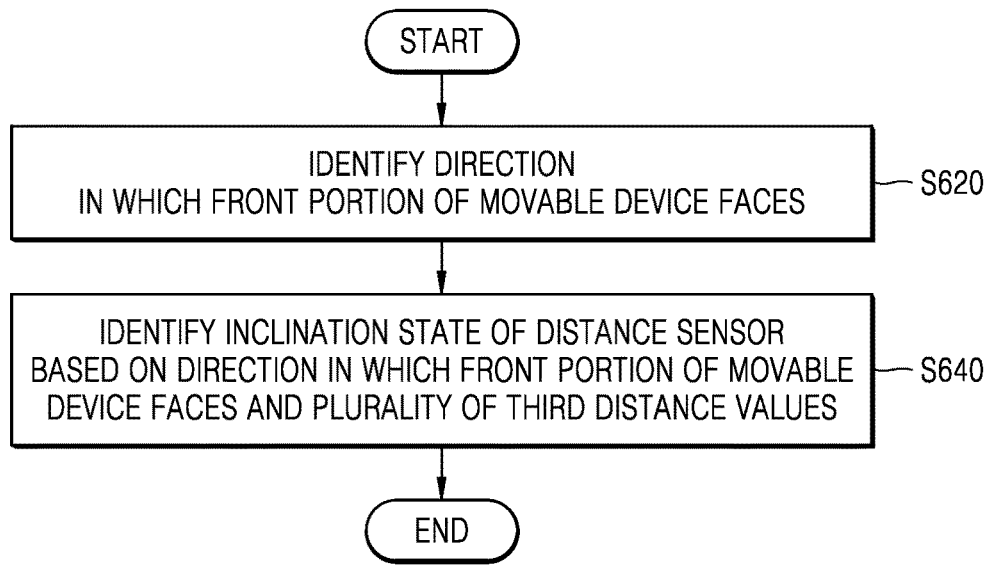
FIG. 6 is a diagram specifically illustrating a method of identifying an inclination state of the distance sensor in the embodiment of FIG. 5.

FIG. 6 is a diagram specifically illustrating a method of identifying an inclination state of a distance sensor in the embodiment of FIG. 5.

According to an embodiment, an operation of identifying the inclination state of the distance sensor may further include an operation of identifying a direction in which the front portion of the movable device faces when measuring the plurality of third distance values and an operation of identifying the inclination state of the distance sensor based on the direction in which the front portion of the movable device faces and the plurality of third distance values, with respect to each of the plurality of measured third distance values. For example, in S620, the movable device 10 may identify the direction in which the front portion of the movable device 10 faces. The front portion of the movable device 10 described in the present specification may mean a moving direction of the movable device when the movable device 10 satisfies a non-holonomic constraint, but is not limited thereto.

In S640, the movable device 10 may identify the inclination state of the distance sensor based on the direction in which the front portion of the movable device faces and the plurality of third distance values. For example, the movable device 10 may obtain the third distance values measured when facing 180 degrees or 360 degrees from among the plurality of third distance values measured while the movable device rotates with respect to a state where the front portion faces an obstacle. In addition, the movable device 10 may obtain the third distance values measured when facing 90 degrees or 270 degrees from among the plurality of third distance values measured while the movable device rotates with respect to the state where the front portion faces the obstacle.

According to an embodiment, when the third distance value measured when facing 180 degrees or 360 degrees with respect to the state where the front portion faces the obstacle is greater than the third distance value measured when facing 90 degrees or 270 degrees with respect to the state where the front portion faces the obstacle by more than a previously set threshold, the movable device 10 may identify the inclination state of the distance sensor in a state inclined with respect to a pitch axis of the movable device. According to another embodiment, when the third distance value measured when facing 180 degrees or 360 degrees with respect to the state where the front portion faces the obstacle is less than the third distance value measured when facing 90 degrees or 270 degrees with respect to the state where the front portion faces the obstacle by less than the previously set threshold, the movable device 10 may identify the inclination state of the distance sensor in a state inclined with respect to a roll axis of the movable device. However, in the present specification, an angle at which the movable device 10 rotates with respect to the state where the front portion of the movable device 10 faces the obstacle is not limited to the above-described embodiment, and may be greater or less than 90 degrees, 180 degrees, 270 degrees, and 360 degrees by a previously set angle.

Figure 7:
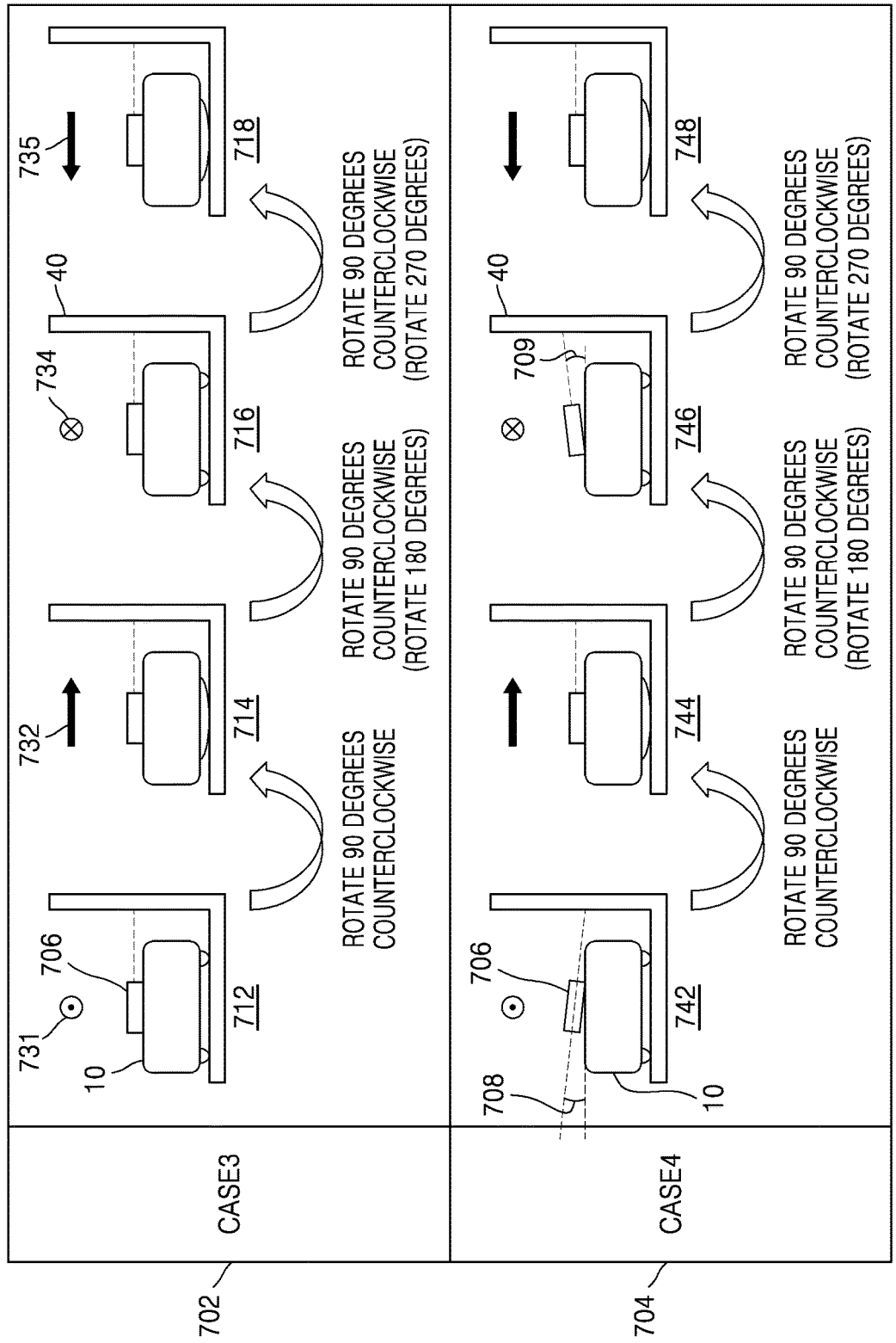
FIG. 7 is a diagram illustrating third distance values measured differently according to an inclination state of a sensor attached to a movable device while the movable device is rotating.

FIG. 7 is a diagram illustrating third distance values measured differently according to an inclination state of a sensor attached to the movable device 10 while the movable device 10 is rotating.

Referring to FIG. 7, symbols 731, 732, 734, and 735 may indicate directions in which a front portion of the movable device 10 faces. Referring to case 3 702 of FIG. 7, it may be seen that in a state where the movable device 10 is stopped, the movable device 1 measures the third distance value between the movable device 10 and an obstacle 40 while rotating counterclockwise by a previously set angle interval. When a distance sensor 706 of the movable device 10 is attached to the movable device 10 in a state parallel to a direction in which the movable device moves (for example, case 3, 702), the third distance values measured while the movable device rotates may be measured to be the same.

For example, the third distance value measured when the front portion of the movable device faces an observer direction (712) (e.g., when the movable device 10 rotates 90 degrees clockwise with respect to a state where the front portion of the movable device 10 faces the obstacle), the third distance value measured when the front portion of the movable device 10 faces the obstacle 40 (714), the third distance value measured when the front portion of the movable device 10 is in a direction away from the observer direction (e.g., when the movable device 10 rotates 90 degrees counterclockwise with respect to the state where the front portion of the movable device faces the obstacle) (716) and the third distance value measured when the front portion of the movable device 10 faces an opposite direction of the obstacle 40 (718) may be measured in the same way.

According to another embodiment, a difference between the third distance value measured when the front portion of the movable device faces the observer direction (712) (e.g., when the movable device 10 rotates 90 degrees clockwise with respect to the state where the front portion of the movable device 10 faces the obstacle 40), the third distance value measured when the front portion of the movable device 10 faces the obstacle 40 (714), the third distance value measured when the front portion of the movable device 10 is in the direction away from the observer direction (e.g., when the movable device 10 rotates 90 degrees counterclockwise with respect to the state where the front portion of the movable device faces the obstacle) (716) and the third distance value measured when the front portion of the movable device 10 faces the opposite direction of the obstacle 40 (718) may be measured to be less than a previously set range.

However, when the distance sensor 104 of the movable device 10 is attached to the movable device 10 in a state that is not parallel to a direction in which the movable device moves (for example, case4) (704) or when the distance sensor 104 is inclined toward a pitch axis or a roll axis of the movable device 10, the third distance values measured while the movable device rotates may be differently measured.

For example, the third distance value measured when the front portion of the movable device faces an observer direction (742) (e.g., when the movable device 10 rotates 90 degrees clockwise with respect to a state where the front portion of the movable device 10 faces the obstacle), the third distance value measured when the front portion of the movable device 10 faces the obstacle 40 (744), the third distance value measured when the front portion of the movable device 10 is in a direction away from the observer direction (e.g., when the movable device 10 rotates 90 degrees counterclockwise with respect to the state where the front portion of the movable device faces the obstacle) (746) and the third distance value measured when the front portion of the movable device 10 faces an opposite direction of the obstacle 40 (748) may be differently measured.

According to another embodiment, a difference between the third distance value measured when the front portion of the movable device faces the observer direction (742) (e.g., when the movable device 10 rotates 90 degrees clockwise with respect to the state where the front portion of the movable device 10 faces the obstacle 40), the third distance value measured when the front portion of the movable device 10 faces the obstacle 40 (744), the third distance value measured when the front portion of the movable device 10 is in the direction away from the observer direction (e.g., when the movable device 10 rotates 90 degrees counterclockwise with respect to the state where the front portion of the movable device faces the obstacle) (746) and the third distance value measured when the front portion of the movable device 10 faces the opposite direction of the obstacle 40 (748) may be measured to be more than the previously set range.

According to an embodiment, when at least one third distance value between the third distance value measured when the front portion of the movable device 10 faces the obstacle 40 (744) and the third distance value measured when the front portion of the movable device 10 faces an opposite direction of the obstacle 40 (748) is greater than at least one third distance value between the third distance value measured when the front portion of the movable device faces an observer direction (742) (e.g., when the movable device 10 rotates 90 degrees clockwise with respect to a state where the front portion of the movable device 10 faces the obstacle) and the third distance value measured when the front portion of the movable device 10 is in a direction away from the observer direction (e.g., when the movable device 10 rotates 90 degrees counterclockwise with respect to the state where the front portion of the movable device faces the obstacle) (746), the movable device 10 may identify an inclination state of a distance sensor in a state inclined with respect to a pitch axis of the movable device 10.

According to another embodiment, when at least one third distance value between the third distance value measured when the front portion of the movable device 10 faces the obstacle 40 (744) and the third distance value measured when the front portion of the movable device 10 faces an opposite direction of the obstacle 40 (748) is less than at least one third distance value between the third distance value measured when the front portion of the movable device faces an observer direction (742) (e.g., when the movable device 10 rotates 90 degrees clockwise with respect to a state where the front portion of the movable device 10 faces the obstacle) and the third distance value measured when the front portion of the movable device 10 is in a direction away from the observer direction (e.g., when the movable device 10 rotates 90 degrees counterclockwise with respect to the state where the front portion of the movable device faces the obstacle) (746), the movable device 10 may identify the inclination state of the distance sensor in a state inclined with respect to a roll axis of the movable device 10.

Figure 8:
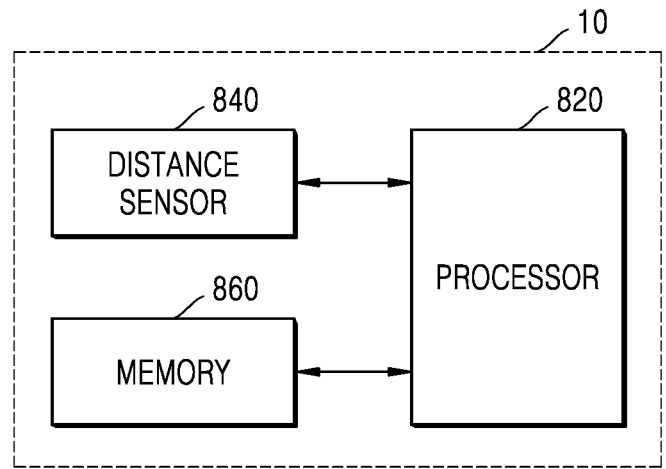
FIG. 8 is a block diagram of a movable device for sensing an inclination of a distance sensor according to an embodiment.

FIG. 8 is a block diagram of the movable device 10 for sensing an inclination of a distance sensor 840 according to an embodiment.

According to an embodiment, the movable device 10 may include at least one processor 820, the distance sensor 840, and a memory 860. However, not all of the illustrated elements are essential elements. The movable device 10 may be implemented by more elements than the illustrated elements, and the movable device 10 may be implemented by less elements.

According to an embodiment, the at least one processor 820 may identify an inclination state of the distance sensor attached to the movable device 10 by executing one or more instructions stored in the memory. For example, the at least one processor 820 may control operations of the distance sensor 840 and the memory 860 by executing the one or more instructions stored in the memory.

For example, the at least one processor 820 according to the present disclosure may sense an obstacle fixed in a task space of the movable device, move the movable device toward the sensed obstacle, while the movable device is moving, measure a plurality of first distance values from the movable device to the obstacle by using the distance sensor, obtain at least one second distance value indicating a moving distance of the movable device while measuring the plurality of first distance values using odometry information of the movable device, and based on the plurality of measured first distance values and the obtained at least one second distance value, identify the inclination state of the distance sensor.

According to another embodiment, the at least one processor 820 according to the present disclosure may determine a first speed value of the movable device based on the plurality of measured first distance values, determine a second speed value of the movable device based on the at least one second distance value obtained from the odometry information, and identify the inclination state of the distance sensor based on the determined first speed value and second speed value. In addition, when a difference between the determined first speed value and the determined second speed value is more than a previously set range, the at least one processor 820 according to the present disclosure may identify the inclination state of the distance sensor with respect to a pitch axis of the movable device.

According to another embodiment, the at least one processor 820 may identify the inclination state of the distance sensor by rotating the movable device in a state where the movable device is stopped, measuring a plurality of third distance values from the movable device to the sense obstacle while the movable device is rotating, and comparing the plurality of measured third distance values with each other.

According to another embodiment, the at least one processor 820 according to the present disclosure may further identify a direction in which a front portion of the movable device faces when measuring the plurality of measured third distance values and identify the inclination state of the distance sensor based on the identified direction in which a front portion of the movable device faces and the plurality of measured third distance values, with respect to each of the plurality of measured third distance values.

In addition, the at least one processor 820 may control the movable device 10 to move straight toward the sensed obstacle. In addition, when the obstacle is sensed, the at least one processor 820 may control the distance sensor such that an attachment surface to which the distance sensor is attached is arranged in a fixed obstacle at a previously set angle. In addition, the at least one processor 820 may control the movable device 10 to move straight toward the obstacle after the attachment surface to which the distance sensor is attached is arranged in the obstacle at the previously set angle. In addition, the at least one processor 820 may control the distance sensor to repeatedly measure the first distance from the distance sensor to the obstacle at a previously set time interval.

According to an embodiment, the at least one processor 820 may control an operation of a sensor driver for controlling an operation of the distance sensor. For example, the at least one processor 820 may control the sensor driver to rotate according to a previously set number of rotations and while the distance sensor mounted on the sensor driver rotates by the sensor driver, emit light to the fixed obstacle and receive light of a reflective light reflected from the obstacle in a previously set direction. In addition, the at least one processor 820 may control the movable device 10 to move straight in a direction opposite to the sensed obstacle.

According to an embodiment, the distance sensor 840 may measure a distance between the movable device 10 and the sensed obstacle. For example, the distance sensor 840 may measure a distance between the movable device 10 and the sensed obstacle using a laser signal. According to another embodiment, the distance sensor 840 may measure a distance between the distance sensor and the sensed obstacle using a laser signal. A configuration of the distance sensor 840 may correspond to that of the distance sensor of FIGS. 1 and 2, and thus, a detailed description thereof will be omitted.

According to an embodiment, the memory 860 may include an internal memory or an external memory. The internal memory may include at least one of, for example, a volatile memory (e.g., dynamic RAM (DRAM), static RAM (SRAM), or synchronous dynamic RAM (SDRAM), etc.), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), a hard drive, or a solid state drive (SSD).

In addition, the external memory according to the present disclosure may include a flash drive, a compact flash (CF) memory, a secure digital (SD) memory, a micro secure digital (Micro-SD) memory, a mini secure digital (Mini-SD) memory, an extreme digital (xD) memory, a multi-media card (MMC), or a memory stick. The external memory may be functionally and/or physically connected to the processor 820 through various interfaces. Programs stored in the memory 820 may be classified into a plurality of modules according to their functions, for example, a driving module for driving a main body, and a sensor driving module for controlling the operation of the distance sensor, but is not limited thereto.

Figure 9:
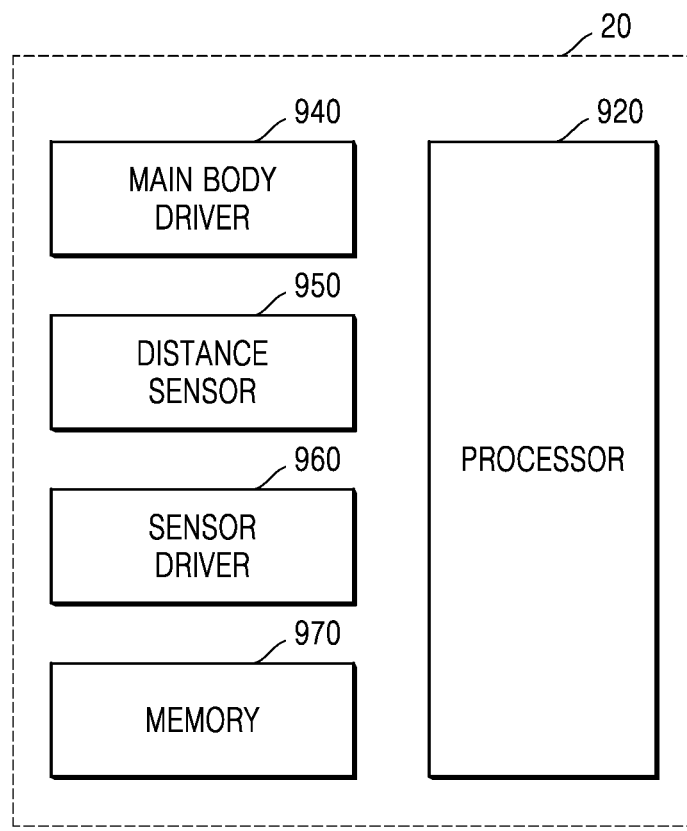
FIG. 9 is a block diagram of a movable device for sensing an inclination of a distance sensor according to another embodiment.

FIG. 9 is a block diagram of the movable device 10 for sensing an inclination of a distance sensor 950 according to another embodiment.

According to another embodiment, the movable device 10 may include at least one processor 920, a main body driver 940, the distance sensor 950, a sensor driver 960, and a memory 970. However, not all of the illustrated elements are essential elements. The movable device 10 may be implemented by more elements than the illustrated elements, and the movable device 10 may be implemented by less elements. A configuration of the processor 920 may correspond to that of the processor 820 of FIG. 8, and thus, a detailed description thereof will be omitted.

According to an embodiment, the main body driver 940 may include configurations used for a movement (an operation) of the movable device 10. For example, the driver 940 may include two wheels installed on both sides of the front, two wheels installed on both sides of the rear, a motor that rotates and drives each of the two wheels of the rear, and a timing belt installed to transfer power generated from the rear wheels to the front wheels, but is not limited thereto. A configuration of the distance sensor 950 may correspond to that of the distance sensor 840 of FIG. 8, and thus, a detailed description thereof will be omitted.

The sensor driver 960 may include configurations necessary to control an operation of the distance sensor 950. For example, the sensor driver 960 may include a support plate located on one surface of the movable device 10 and for periodically rotating the distance sensor, and a sensor inclination controller capable of adjusting an inclination of the distance sensor in a direction of a pitch axis, a roll axis, and a yaw axis, but is not limited thereto. The memory 970 may correspond to the memory 860 of FIG. 8, and thus, a detailed description thereof will be omitted.

Figure 10:
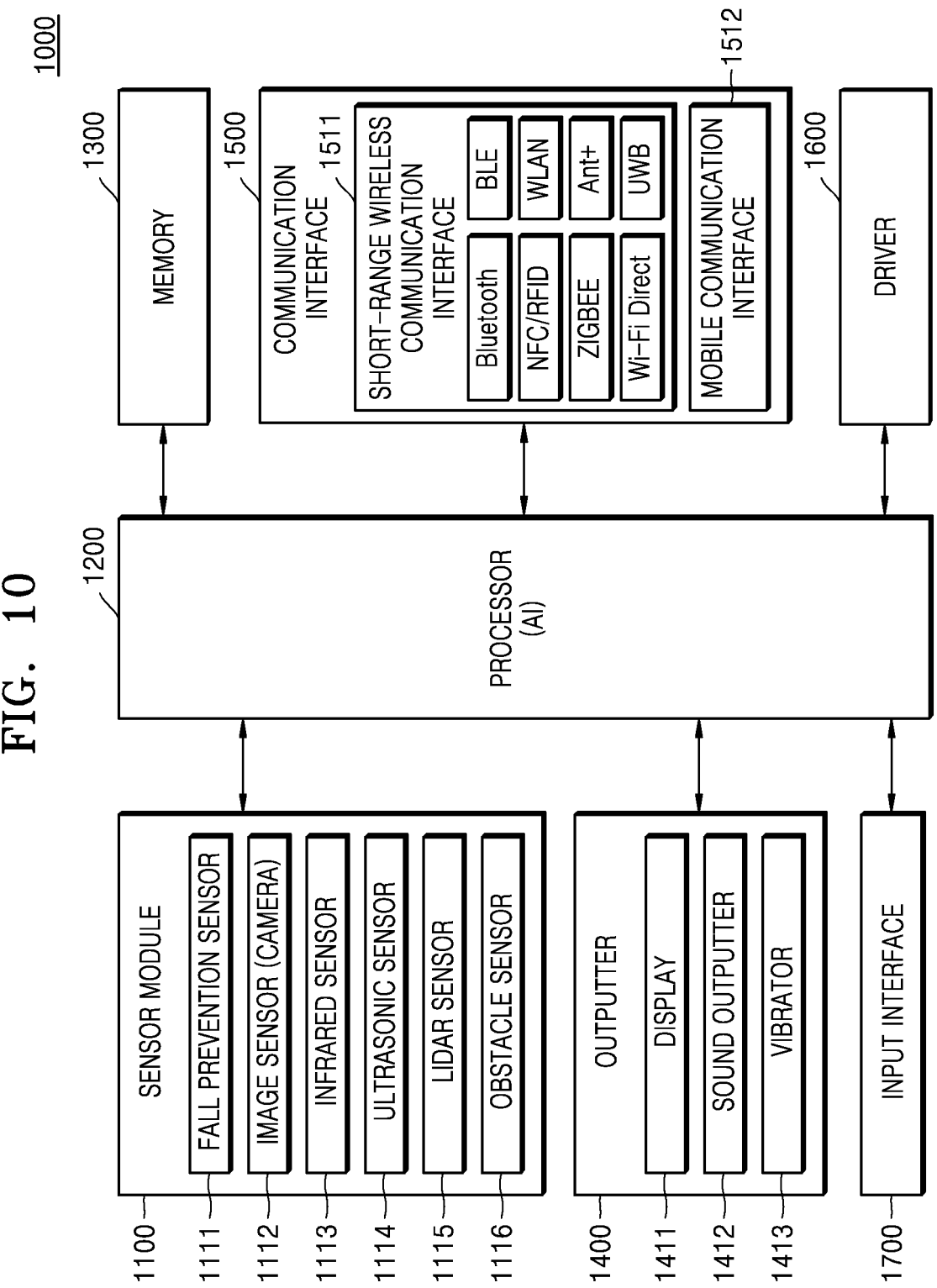
FIG. 10 is a block diagram of a movable device for sensing an inclination of a distance sensor according to another embodiment.

FIG. 10 is a block diagram of a movable device 1000 for sensing an inclination of the distance sensor 950 according to another embodiment.

Referring to FIG. 9, the movable device 10 may include the at least one processor 920, the main body driver 940, the distance sensor 950, the sensor driver 960, and the memory 970. However, not all of the illustrated elements are essential elements. The movable device 10 may be implemented by more elements than the illustrated elements, and the movable device 10 may be implemented by less elements. For example, as shown in FIG. 10, the movable device 1000 may further include, in addition to the sensor module 1100, the processor 1200, and the memory 1300, an outputter 1400, a communicator 1500, a driver 1800, and a power supply 1700. Let's look at each configuration in turn.

The sensor module 1100 may include a plurality of sensors configured to detect information about an environment around the movable device 1000. For example, the sensor module 1100 may include a fall prevention sensor 1111, an image sensor (camera) 1112 (for example, a stereo camera, a mono camera, a wide angle camera, an around view camera, or a three-dimensional (3D) vision sensor), an infrared sensor 1113, an ultrasonic sensor 1114, a lidar sensor 1115, an obstacle sensor 1116, a mileage sensor (not illustrated), and the like, but embodiments of the disclosure are not limited thereto. The mileage sensor may include a rotation detection sensor configured to calculate a rotation speed of a wheel. For example, the rotation detection sensor may be an encoder provided to detect a rotation speed of a motor. Because the functions of the respective sensors may be intuitively inferred from their names, detailed descriptions thereof will be omitted.

According to an embodiment, the sensor module 1100 may be used to generate an indoor space map. For example, the movable device 1000 may generate the indoor space map by using at least one of the camera 1112, the ultrasonic sensor 1114, or the LIDAR sensor 1115.

The processor 1200 may control the overall operation of the movable device 1000. The processor 1200 may control the sensor module 1100, the outputter 1400, the communicator 1500, the driver 1600, and the power supply 1700 by executing programs stored in a storage 160.

According to an embodiment, the processor 1200 may include an artificial intelligence (AI) processor. In this case, the AI processor may identify an inclination state of a distance sensor attached to the movable device by using a learning network model of an AI system. The AI processor may be manufactured in the form of a dedicated hardware chip for AI, or may be manufactured as part of an existing general-purpose processor (for example, a CPU or an application processor) or a dedicated graphics processor (for example, a GPU), and may be mounted on the movable device 1000.

The processor 1200 may be responsible for cleaning driving such as determining the moving direction of the movable device 1000, position recognition, and automatic charging of a battery. For example, the processor 1200 may perform a control so that the battery waits in a state of being connected to an external charging device when the battery is not in operation, thereby maintaining a battery level within a predetermined range. When a charge request and a signal are input from a battery level detector at the time of operation completion or during operation, the processor 1200 may control the driver 1600 to return to the external charging device. The processor 1200 may correspond to the processor 820 of FIG. 8, and thus, a detailed description thereof will be omitted.

The memory 1300 may store programs for processing and control of the processor 1200 and may store input or output data (distance values measured from the distance sensor, information about the inclination state of the distance sensor, etc.) The memory 1300 may store an AI model.

The memory 1300 may correspond to the memory 860 of FIG. 8, and thus, a detailed description thereof will be omitted.

The outputter 1400 may output an audio signal, a video signal, or a vibration signal and may include a display 1411, a sound outputter 1412, and a vibrator 1413. The display 1411 may display information that is processed by the movable device 1000. For example, the display 1411 may display a current position of the movable device 1000, may display a cleaning mode of the movable device 1000, or may display a cleaning state (for example, a progress rate) and a charging state (for example, a remaining battery level), but embodiments of the disclosure are not limited thereto. The display 1411 may display a user interface (UI) or a graphical user interface (GUI) associated with a mode setting.

Meanwhile, when the display 1411 and a touch pad form a layered structure to constitute a touch screen, the display 1411 may also be used as an input device as well as an output device. The display 1411 may include at least one selected from a liquid crystal display (LCD), a thin film transistor-liquid crystal display (TFT-LCD), an organic light-emitting diode (OLED), a flexible display, a 3D display, and an electrophoretic display. The movable device 1000 may include two or more displays 1411 according to the implementation form of the movable device 1000.

According to an embodiment, the display 1411 may include a transparent display. The transparent display may be implemented as a transparent LCD type, a transparent thin-film electroluminescent panel (TFEL) type, a transparent OLED type, and a projection type. The projection type refers to a method of displaying an image by projecting the image on a transparent screen such as a head up display (HUD).

The sound outputter 1412 may output audio data received from the communicator 1500 or stored in the memory 1300. In addition, the sound outputter 1412 may output a sound signal associated with the function performed by the movable device 1000. For example, the sound outputter 1412 may output a voice message notifying a user of completion of cleaning. The sound outputter 1412 may include a speaker, a buzzer, or the like.

The vibrator 1413 may output a vibration signal. For example, the vibrator 1413 may output a vibration signal corresponding to the output of audio data or video data (for example, a warning message or the like).

The communicator 1500 may include at least one antenna configured to wirelessly communicate with another device (for example, an external robot vacuum cleaner, the mobile device 100, or an external server). For example, the communicator 1500 may include one or more elements configured to enable communication between the movable device 1000 and another movable device 1000 or between the movable device 1000 and the server. For example, the communicator 1500 may include a short-range wireless communication interface 1511, a mobile communication interface 1512, and the like, but embodiments of the disclosure are not limited thereto.

The short-range wireless communication interface 1511 may include a Bluetooth communication interface, a BLE communicator, a near field communication interface, a WLAN (Wi-Fi) communication interface, a Zigbee communication interface, an IrDA communication interface, a WFD communication interface, a UWB communication interface, an Ant+ communication interface, or a microwave (uWave) communication interface, but embodiments of the disclosure are not limited thereto.

The mobile communication interface 1512 may transmit or receive a wireless signal with respect to at least one selected from a base station, an external terminal, and a server via a mobile communication network. The wireless signal may include a voice call signal, a video call signal, or various types of data according to text or multimedia message transmission and reception.

The driver 1600 may include elements used for driving (operation) of the movable device 1000 and operations of devices in the movable device 1000. The driver 1600 may include a suction portion, a driving portion, and the like, but embodiments of the disclosure are not limited thereto. The suction portion collects dust on the floor while suctioning air. The suction portion may include a rotation brush or a broom, a rotation brush motor, an air suction port, a filter, a dust collecting chamber, an air discharge port, and the like, but embodiments of the disclosure are not limited thereto. The suction portion may additionally be mounted in a structure in which a brush capable of sweeping out dust from a corner is rotated.

The driving portion may include two front wheels on both sides of the front, two rear wheels on both sides of the rear, motors respectively configured to rotate and drive the two rear wheels, timing belts configured to transfer power generated from the two rear wheels to the two front wheels, and the like, but embodiments of the disclosure are not limited thereto.

According to an embodiment, the movable device 1000 may include an inputter (not shown). The inputter refers to a device configured to input data for the user to control the movable device 1000. For example, the inputter may include a key pad, a dome switch, a touch pad (for example, a touch-type capacitive touch pad, a pressure-type resistive touch pad, an infrared beam sensing-type touch pad, a surface acoustic wave-type touch pad, an integral strain gauge-type touch pad, a piezoelectric effect-type touch pad, or the like), a jog wheel, and a jog switch, but the embodiments of the disclosure are not limited thereto.

The method according to an embodiment may be embodied as program commands that are executable by various computer devices and may be recorded on a computer-readable recording medium. In addition, according to an embodiment, a computer program device or a computer program product including a recording medium in which a program for performing a method of sensing an inclination of a distance sensor attached to a movable device is stored may be provided.

The computer-readable recording medium may include program commands, data files, data structures, and the like, alone or in combination. The program commands recorded on the computer-readable recording medium may be specially designed and configured for the disclosure, or may be well known to and usable by those of ordinary skill in the field of computer software. Examples of the computer-readable recording medium include magnetic media (e.g., a hard disk, a floppy disk, magnetic tape, etc.), optical media (e.g., a compact disc-read-only memory (CD-ROM), a digital versatile disc (DVD), etc.), magneto-optical media (e.g., a floptical disk, etc.), and hardware devices (e.g., ROM, RAM, flash memory, etc.) specially configured to store and execute program commands. Examples of the program commands include not only machine language code produced by a compiler but also high-level language code executable by a computer using an interpreter or the like.

Embodiments may be embodied in the form of a computer-readable recording medium including computer-executable instructions such as computer-executable program modules. The computer-readable recording medium may be any available medium that is accessible by a computer and may include any volatile and non-volatile media and any removable and non-removable media. Also, the computer-readable recording medium may include any computer storage medium and communication medium. The computer storage medium may include any volatile and non-volatile medium and any removable and non-removable medium embodied by any method or technology for storing information such as computer-readable instructions, data structures, program modules, or other data. The communication medium may include computer-readable instructions, data structures, program modules, other data of modulated data signals such as carriers, or other transmission mechanisms, and may include any information transmission medium. Also, embodiments may also be embodied as a computer program or a computer program product including computer-executable instructions such as a computer-executable program.

While the embodiments of the disclosure have been described in detail, it will be understood by one of ordinary skill in the art that various changes in form and details may be made therein without departing from the spirit and scope of the disclosure as defined by the following claims.

The invention claimed is:

1. A method, performed by a movable device, of sensing an inclination of a distance sensor attached to the movable device, the method comprising:
    sensing an obstacle fixed in a task space of the movable device;
    moving toward the sensed obstacle;
    while the movable device is moving, measuring a plurality of first distance values from the movable device to the obstacle using the distance sensor;
    obtaining at least one second distance value indicating a moving distance of the movable device while measuring the plurality of first distance values, using odometry information of the movable device; and
    identifying an inclination state of the distance sensor based on the plurality of measured first distance values and the obtained at least one second distance value,
    wherein the identifying of the inclination state of the distance sensor comprises:
        determining a first speed value of the movable device based on the plurality of measured first distance values;
        determining a second speed value of the movable device based on the at least one second distance value obtained from the odometry information; and
        identifying the inclination state of the distance sensor based on the determined first and second speed values.

2. The method of claim 1, wherein the moving comprises moving straight toward the sensed obstacle.

3. The method of claim 2, further comprising:
    when the obstacle is sensed, arranging an attachment surface to which the distance sensor is attached to the fixed obstacle at a previously set angle, wherein the moving comprises moving straight toward the sensed obstacle after the distance sensor is arranged at the previously set angle.

4. The method of claim 1, wherein the measuring of the plurality of first distance values comprises measuring the plurality of first distance values from the distance sensor to the obstacle.

5. The method of claim 1, wherein the measuring of the plurality of first distance values comprises, while the movable device is moving, measuring a first distance to the obstacle at a previously set time interval.

6. The method of claim 1, wherein the odometry information is previously set to estimate a moving distance of the movable device using driving information associated with a driver of the movable device.

7. The method of claim 1, wherein the distance sensor is configured to emit light to the fixed obstacle and receive light of a reflective light reflected from the obstacle in a previously set direction while rotating according to a previously set number of rotations by a sensor driver for controlling an operation of the distance sensor.

8. The method of claim 1, wherein the moving comprises moving straight in a direction opposite to the sensed obstacle.

9. The method of claim 1, wherein the identifying of the inclination state of the distance sensor comprises, when a difference between the determined first speed value and the determined second speed value is more than a previously set range, identifying that the distance sensor is in an inclined state with respect to a pitch axis of the movable device.

10. The method of claim 1, further comprising:
   rotating the movable device in a state where the movable device is stopped;
   measuring a plurality of third distance values from the movable device to the sensed obstacle while the movable device is rotating; and
   identifying the inclination state of the distance sensor by comparing the plurality of measured third distance values with each other.

11. The method of claim 10, wherein the measuring of the plurality of third distance values comprises measuring the plurality of third distance values while rotating the movable device by a previously set angle interval.

12. The method of claim 10, wherein the identifying of the inclination state of the distance sensor further comprises:
   with respect to each of the plurality of measured third distance values, identifying a direction in which a front portion of the movable device faces when measuring the plurality of third distance values,
   identifying the inclination state of the distance sensor based on the identified direction in which the front portion of the movable device faces and the plurality of measured third distance values.

13. A movable device for sensing an inclination of a distance sensor configured to measure a distance, the movable device comprising:
   at least one memory storing one or more instructions; and
   at least one processor configured to execute the one or more instructions,
   wherein the at least one processor is configured to execute the one or more instructions to:
      sense an obstacle fixed in a task space of the movable device,
      move the movable device toward the sensed obstacle,
      while the movable device is moving, measure a plurality of first distance values from the movable device to the obstacle using the distance sensor,
      obtain at least one second distance value indicating a moving distance of the movable device while measuring the plurality of first distance values, using odometry information of the movable device,
      identify an inclination state of the distance sensor based on the plurality of measured first distance values and the obtained at least one second distance value,
      determine a first speed value of the movable device based on the plurality of measured first distance values, and
      determine a second speed value of the movable device based on the at least one second distance value obtained from the odometry information, and
      wherein the inclination state of the distance sensor is identified based on the determined first and second speed values.

14. A non-transitory computer-readable recording medium having recorded thereon a program which, when executed by at least one processor, causes the at least one processor to control a movable device to perform operations comprising:
   sensing an obstacle fixed in a task space of the movable device;
   moving toward the sensed obstacle;
   while the movable device is moving, measuring a plurality of first distance values from the movable device to the obstacle using a distance sensor;
   obtaining at least one second distance value indicating a moving distance of the movable device while measuring the plurality of first distance values, using odometry information of the movable device; and
   identifying an inclination state of the distance sensor based on the plurality of measured first distance values and the obtained at least one second distance value,
   wherein the identifying of the inclination state of the distance sensor comprises:
      determining a first speed value of the movable device based on the plurality of measured first distance values;
      determining a second speed value of the movable device based on the at least one second distance value obtained from the odometry information; and
      identifying the inclination state of the distance sensor based on the determined first and second speed values.

15. A movable device comprising the non-transitory computer-readable recording medium of claim 14.

* * * * *